(12) United States Patent
Wipf

(10) Patent No.: US 11,932,064 B1
(45) Date of Patent: Mar. 19, 2024

(54) CONVERTIBLE TOW HITCH SYSTEM

(71) Applicant: Danny Wipf, Lake Andes, SD (US)

(72) Inventor: Danny Wipf, Lake Andes, SD (US)

( * ) Notice: Subject to any disclaimer, the term of this patent is extended or adjusted under 35 U.S.C. 154(b) by 714 days.

(21) Appl. No.: 17/036,484

(22) Filed: Sep. 29, 2020

Related U.S. Application Data

(63) Continuation-in-part of application No. 16/211,379, filed on Dec. 6, 2018, now Pat. No. 11,312,192.

(51) Int. Cl.
*B60D 1/06* (2006.01)
*B60D 1/52* (2006.01)
*B60D 1/54* (2006.01)

(52) U.S. Cl.
CPC ............... *B60D 1/06* (2013.01); *B60D 1/52* (2013.01); *B60D 1/54* (2013.01)

(58) Field of Classification Search
CPC ............ B60D 1/06; B60D 1/52; B60D 1/54
See application file for complete search history.

(56) References Cited

U.S. PATENT DOCUMENTS

| | | | |
|---|---|---|---|
| 3,801,134 A | 4/1974 | Dees | |
| 4,275,899 A * | 6/1981 | Humphrey | B60D 1/07 280/497 |
| 4,482,167 A | 11/1984 | Haugrud | |
| 6,312,004 B1 | 11/2001 | Kiss | |
| 6,502,845 B1 | 1/2003 | Van Vleet | |
| 6,712,381 B1 * | 3/2004 | Moss | B60D 1/54 280/491.1 |
| 6,837,510 B1 * | 1/2005 | Karls | B60D 1/07 D12/162 |
| 6,945,550 B2 | 9/2005 | Williams | |
| 7,029,022 B2 * | 4/2006 | Moss | B60D 1/54 280/490.1 |
| 8,276,932 B2 * | 10/2012 | Columbia | B60D 1/52 280/495 |
| 8,371,603 B2 | 2/2013 | Columbia | |
| 9,199,520 B2 * | 12/2015 | Weipert | B60D 1/46 |
| 2002/0047247 A1 * | 4/2002 | Moss | B60D 1/07 280/504 |
| 2004/0007852 A1 | 1/2004 | Tambornino | |
| 2005/0280245 A1 * | 12/2005 | Eberle | B60D 1/07 280/416.1 |
| 2006/0214391 A1 * | 9/2006 | Columbia | B60D 1/07 280/491.5 |

(Continued)

OTHER PUBLICATIONS

CTD Hitches, brochure, 14 pages. Canadian Tool & Die Ltd., Winnipeg, MB, Canada.

*Primary Examiner* — Minnah L Seoh
*Assistant Examiner* — Marlon A Arce
(74) *Attorney, Agent, or Firm* — Jeffrey A. Proehl; Woods, Fuller, Shultz & Smith, PC

(57) ABSTRACT

A convertible hitch apparatus may include a mount structure for mounting on a hitch receiver tube and an upper hitch structure mounted on the mount structure. The upper hitch structure may have a deployed condition and an inactive condition, with an upper ball mount being movable between a deployed position corresponding to the deployed condition and a storage position corresponding to the inactive condition. The hitch apparatus may also include a lower hitch structure mounted on the mount structure at a position below the upper hitch structure, and a ball hitch assembly removably mountable on at least one of the ball mounts.

20 Claims, 18 Drawing Sheets

(56) References Cited

U.S. PATENT DOCUMENTS

2007/0252360 A1    11/2007   Wooten
2008/0179861 A1     7/2008   Columbia
2017/0087947 A1     3/2017   Moore \* cited by examiner

CONVERTIBLE TOW HITCH SYSTEM

REFERENCE TO RELATED APPLICATION

This application is a continuation-in-part of U.S. patent application Ser. No. 16/211,379, filed Dec. 6, 2018, which is hereby incorporated by reference in its entirety.

BACKGROUND

Field

The present disclosure relates to tow hitch systems and more particularly pertains to a new convertible tow hitch system for facilitating conversion of a hitch apparatus between configurations usable with different types of fishing systems.

SUMMARY

In one aspect, the present disclosure relates to a convertible hitch apparatus which may be removably mountable on a hitch receiver tube and include a mount tube assembly being at least partially insertable into the receiver tube for mounting on the hitch receiver tube, with the mount tube assembly defining a retraction channel and an upper hitch aperture. The apparatus may also include a lower mount support movably mounted on the retraction channel of the mount tube assembly to move between a retracted position and an extended position with respect to the mount tube assembly. The lower mount support may define a lower hitch aperture which may be below and in substantially vertical alignment with the upper hitch aperture when the lower mount support is in the retracted position. The lower hitch aperture may be moved out of vertical alignment with the upper hitch aperture when the lower mount support is in the retracted position.

In another aspect, the present disclosure relates to a hitch system between a towing vehicle and a trailing vehicle. The hitch system may include a hitch receiver tube mounted on the towing vehicle and the receiver tube defining a tube interior, and a convertible hitch apparatus removably mountable on the hitch receiver tube. The apparatus may comprise a mount tube assembly being at least partially inserted into the receiver tube for mounting on the hitch receiver tube, with the mount tube assembly defining a retraction channel and an upper hitch aperture. The hitch apparatus may also include a lower mount support movably mounted on the retraction channel of the mount tube assembly to move between a retracted position and an extended position with respect to the mount tube assembly. The lower mount support may define a lower hitch aperture being below and in substantially vertical alignment with the upper hitch aperture when the lower mount support is in the retracted position, and the lower hitch aperture may be moved out of vertical alignment with the upper hitch aperture when the lower mount support is in the retracted position.

In still another aspect, the disclosure relates to a convertible hitch apparatus removably mountable on a hitch receiver tube, with the hitch apparatus being elongated along a longitudinal axis. The hitch apparatus may comprise a mount structure for mounting on the hitch receiver tube, with the mount structure being at least partially insertable into the receiver tube and the insertion portion having an insertion end insertable into the receiver tube and a protrusion end opposite of the insertion end. The hitch apparatus may also include an upper hitch structure mounted on the mount structure toward the protrusion end, with the upper hitch structure having a deployed condition and an inactive condition. The upper hitch structure may comprise a support frame and an upper ball mount mounted on the support frame for movement between a deployed position corresponding to the deployed condition and a storage position corresponding to the inactive condition. The hitch apparatus may further include a lower hitch structure mounted on the mount structure toward the protrusion end at a position below the upper hitch structure, with the lower hitch structure including a lower ball mount mounted on the mount structure, and a ball hitch assembly removably mountable on at least one of the ball mounts.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
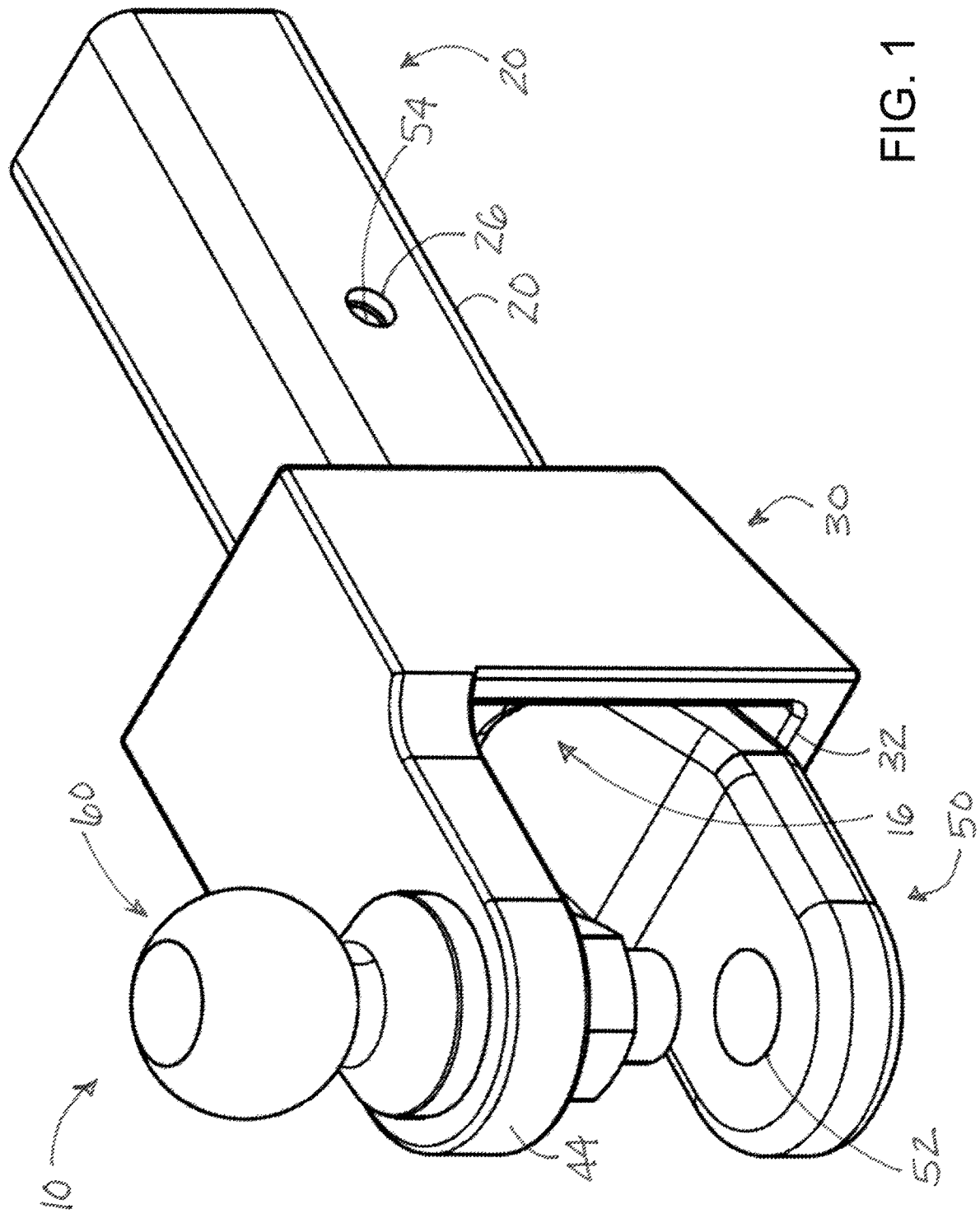
FIG. 1 is a schematic perspective view of a new convertible tow hitch apparatus for use in a hitch system, the hitch apparatus being shown with a ball hitch and a lower mount support in a retracted position, according to the present disclosure.
Figure 2:
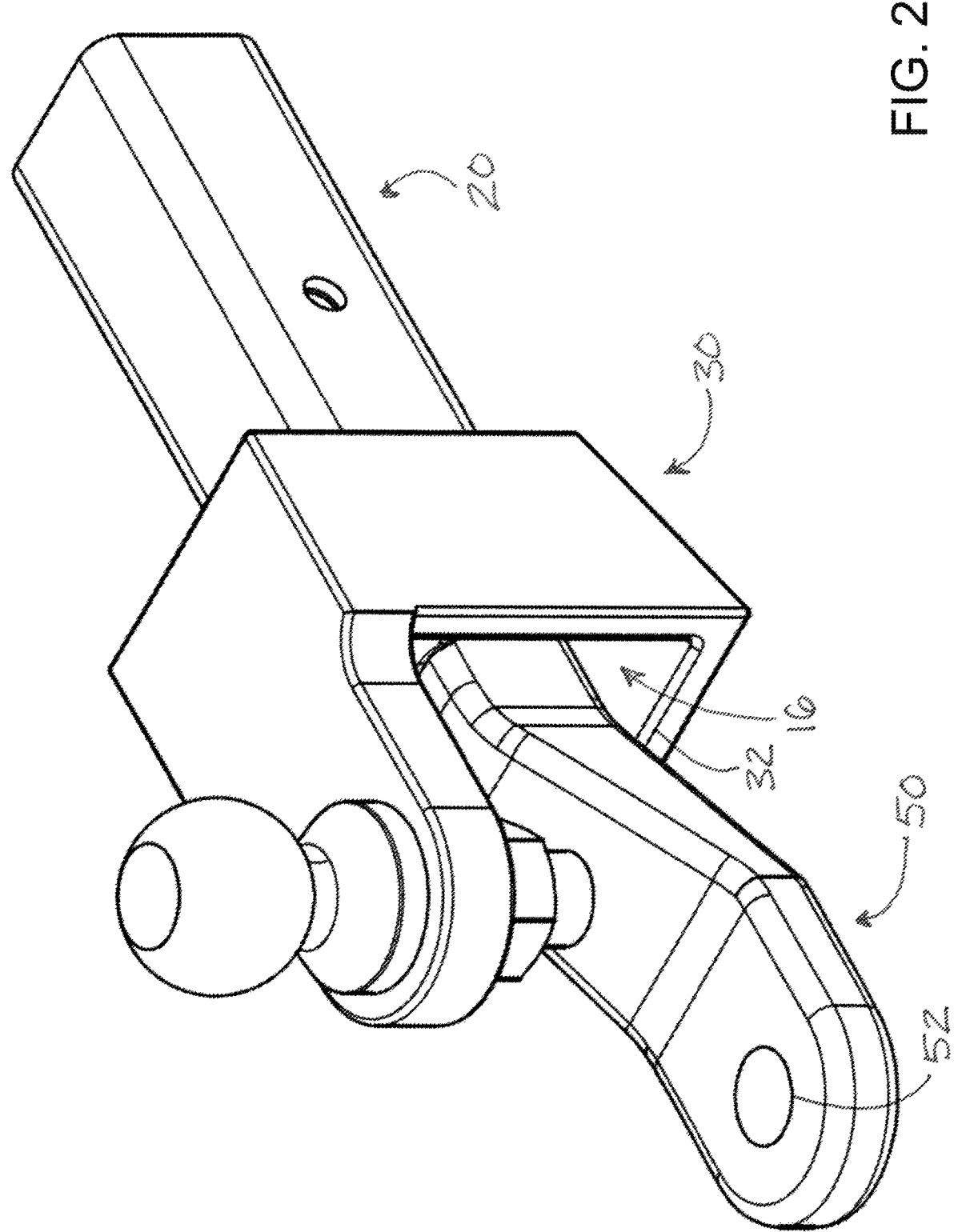
FIG. 2 is a schematic perspective view of the hitch apparatus with the lower mount support shown in an extended condition, according to an illustrative embodiment.
Figure 3:
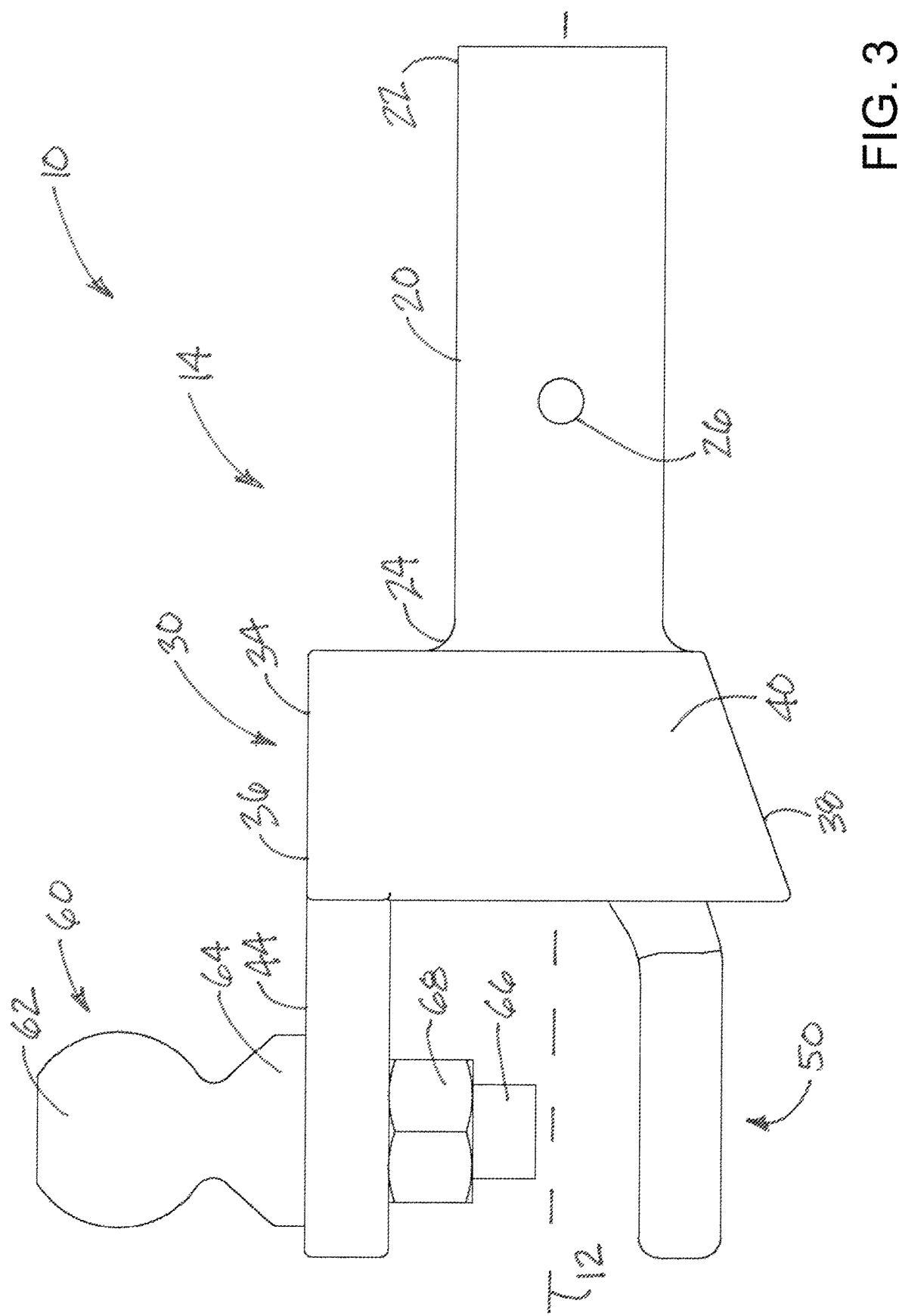
FIG. 3 is a schematic side view of the hitch apparatus in the retracted condition, according to an illustrative embodiment.
Figure 4:
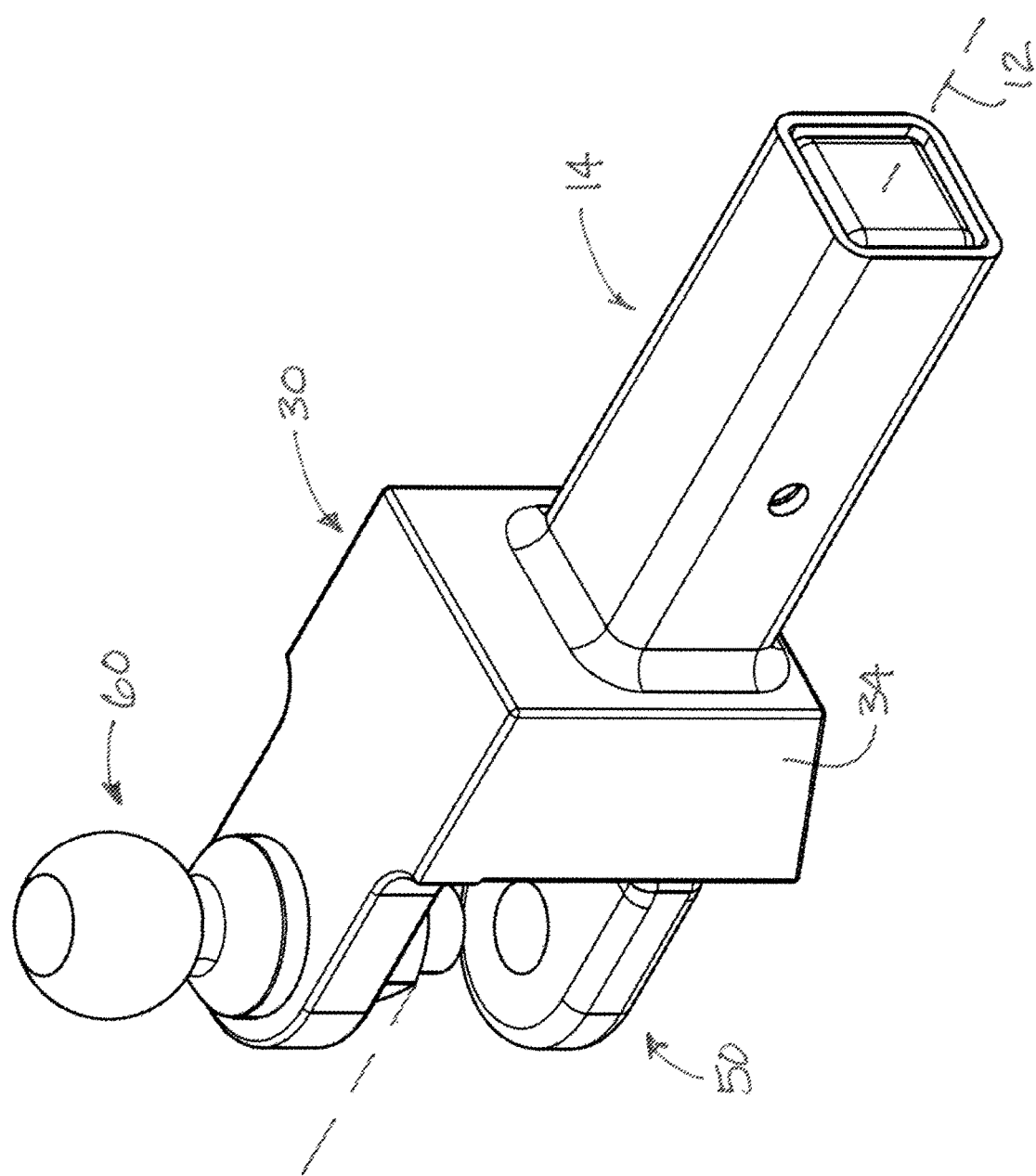
FIG. 4 is a schematic perspective view of the hitch apparatus, according to an illustrative embodiment.
Figure 5:
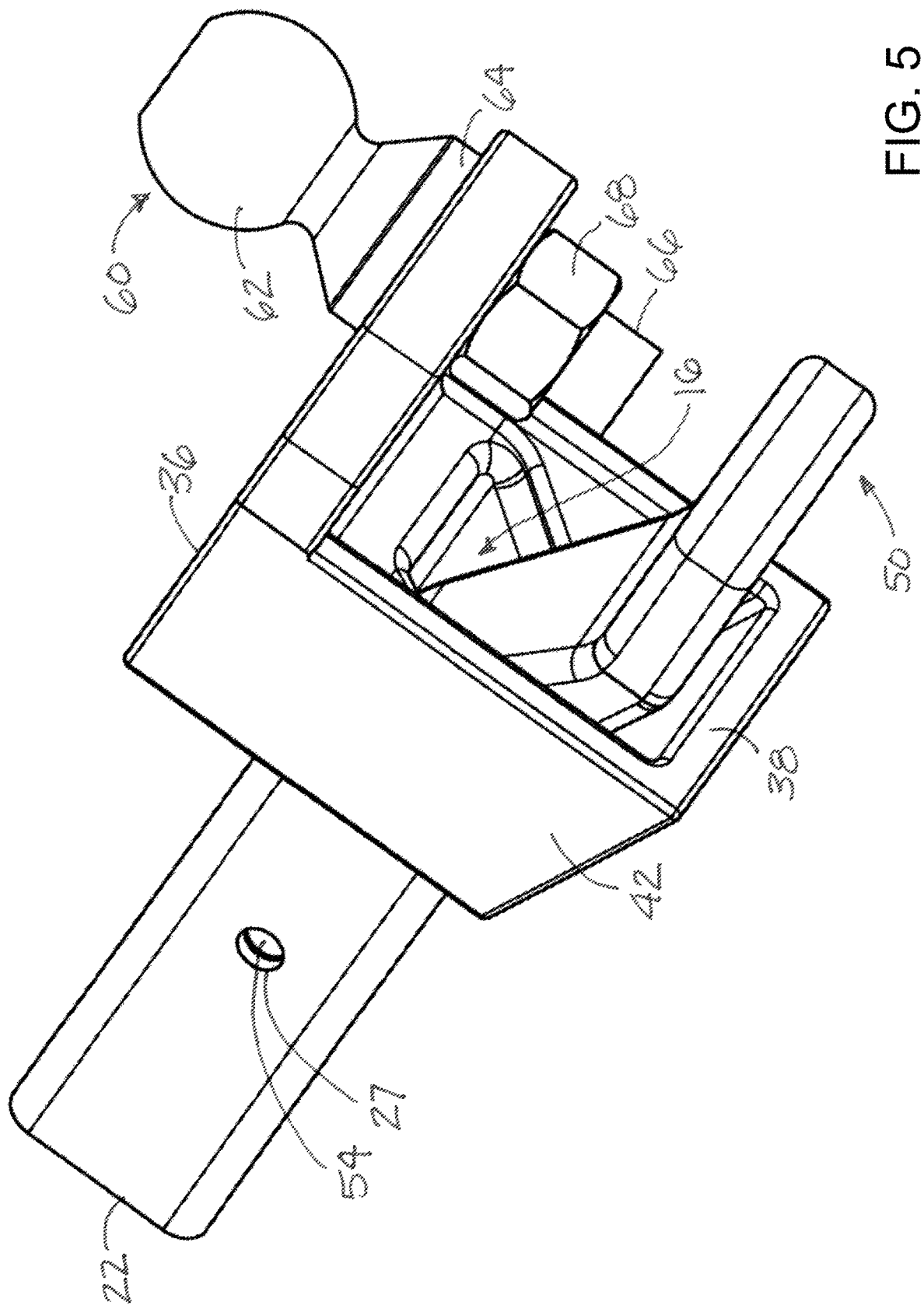
FIG. 5 is a schematic perspective view of the hitch apparatus, according to an illustrative embodiment.
Figure 6:
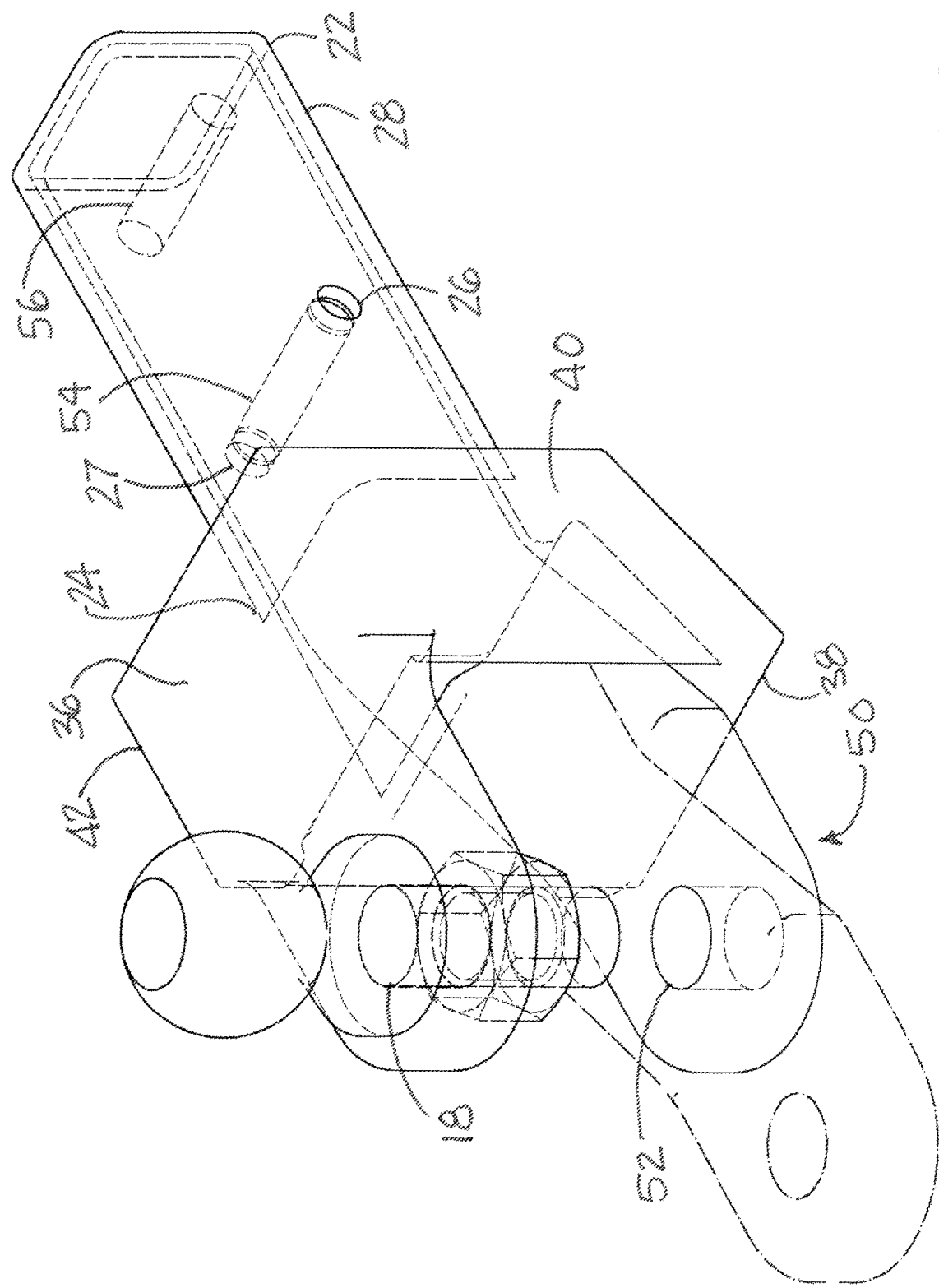
FIG. 6 is a schematic perspective view of the hitch apparatus shown with phantom lines to reveal internal features of the apparatus and the lower mount support in a retracted and extended position, according to an illustrative embodiment.
Figure 7:
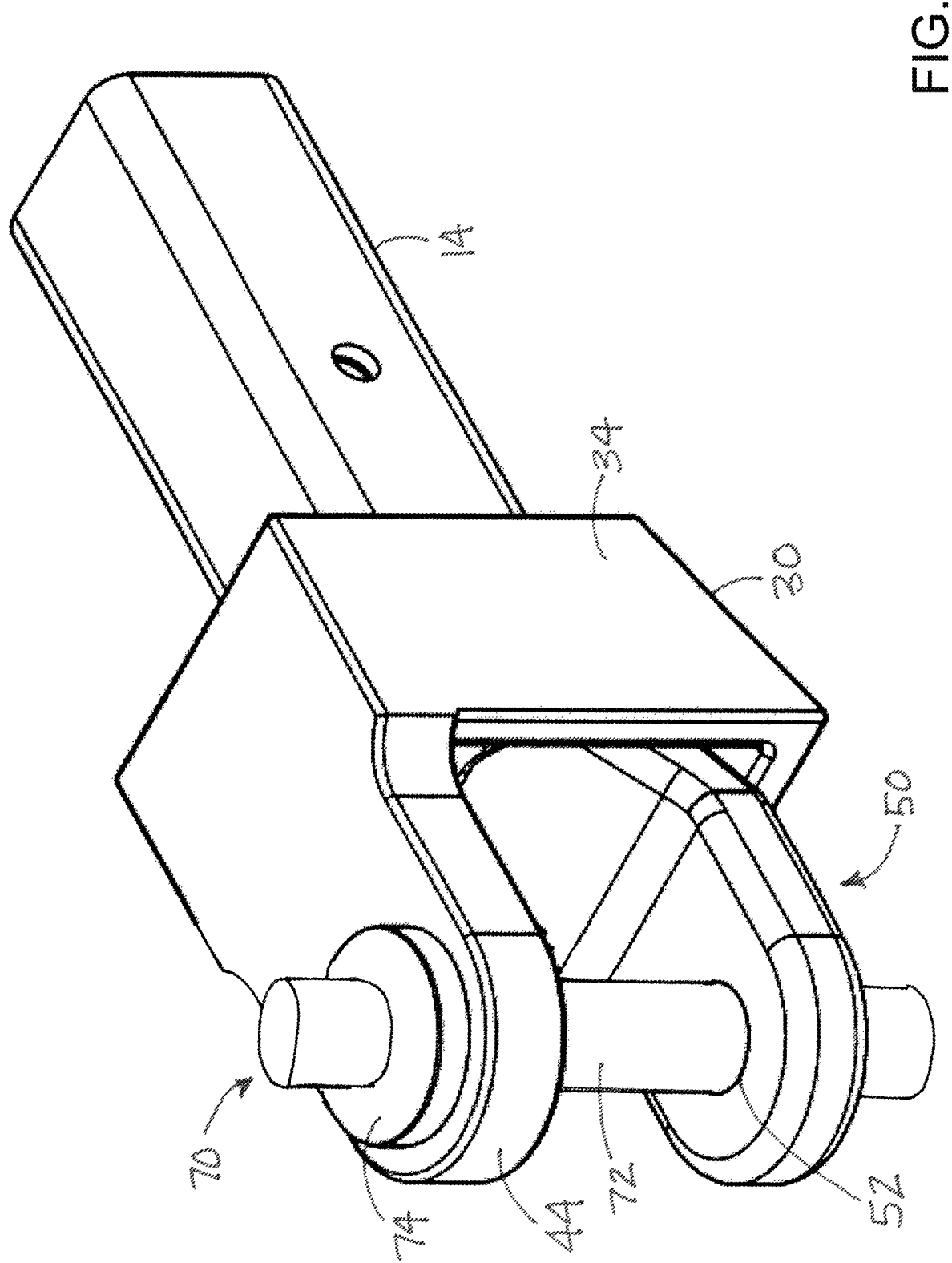
FIG. 7 is a schematic perspective view of the hitch apparatus shown with a hitch pin for a clevis hitch, according to the present disclosure.
Figure 8:
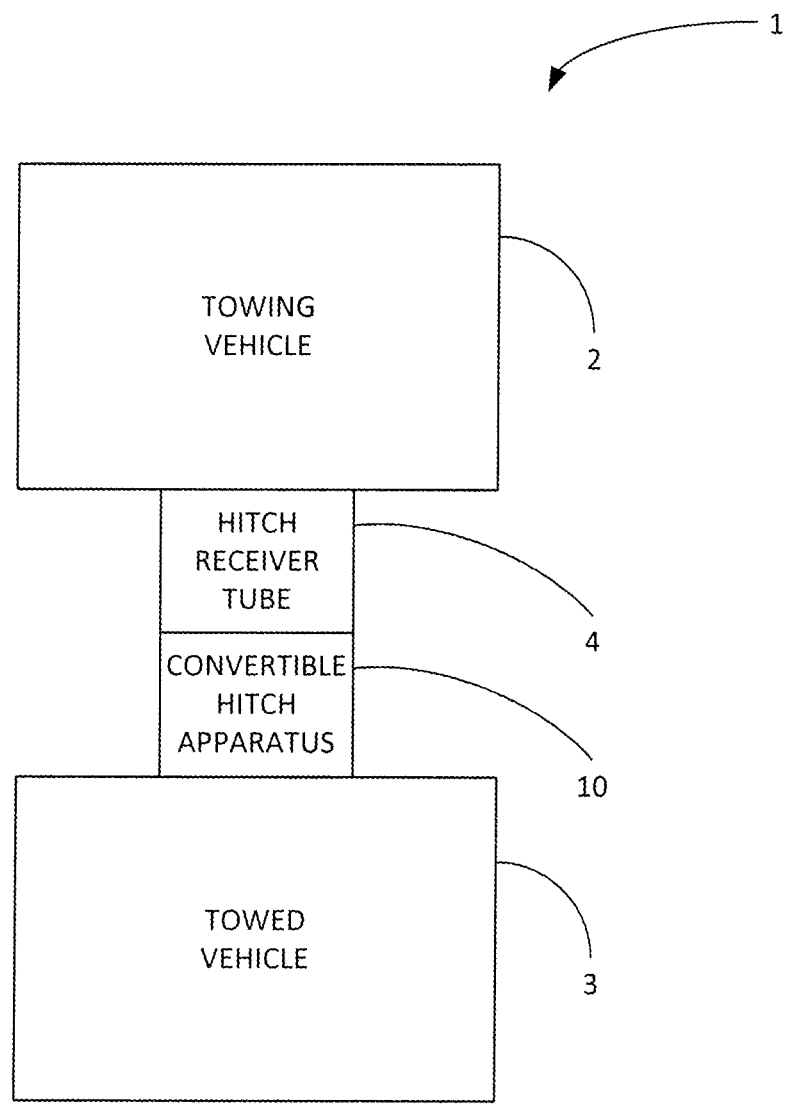
FIG. 8 is a schematic diagram of a hitch system utilizing the convertible hitch apparatus, according to the present disclosure.
Figure 9:
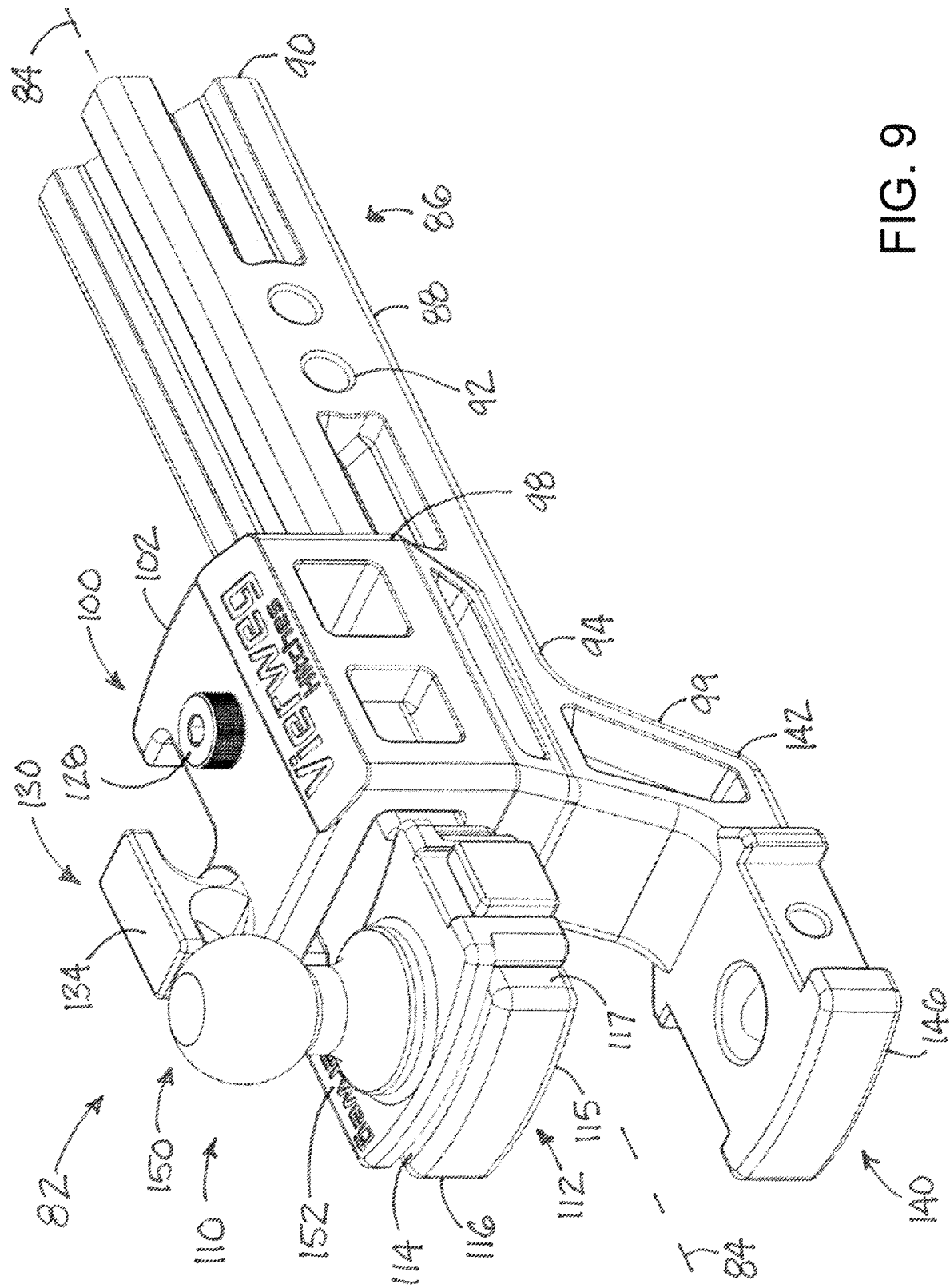
FIG. 9 is a schematic perspective view of another embodiment of a new convertible tow hitch apparatus for use in a hitch system, the hitch apparatus being shown in a ball hitch configuration with the upper hitch structure in the deployed condition, according to the present disclosure.
Figure 10:
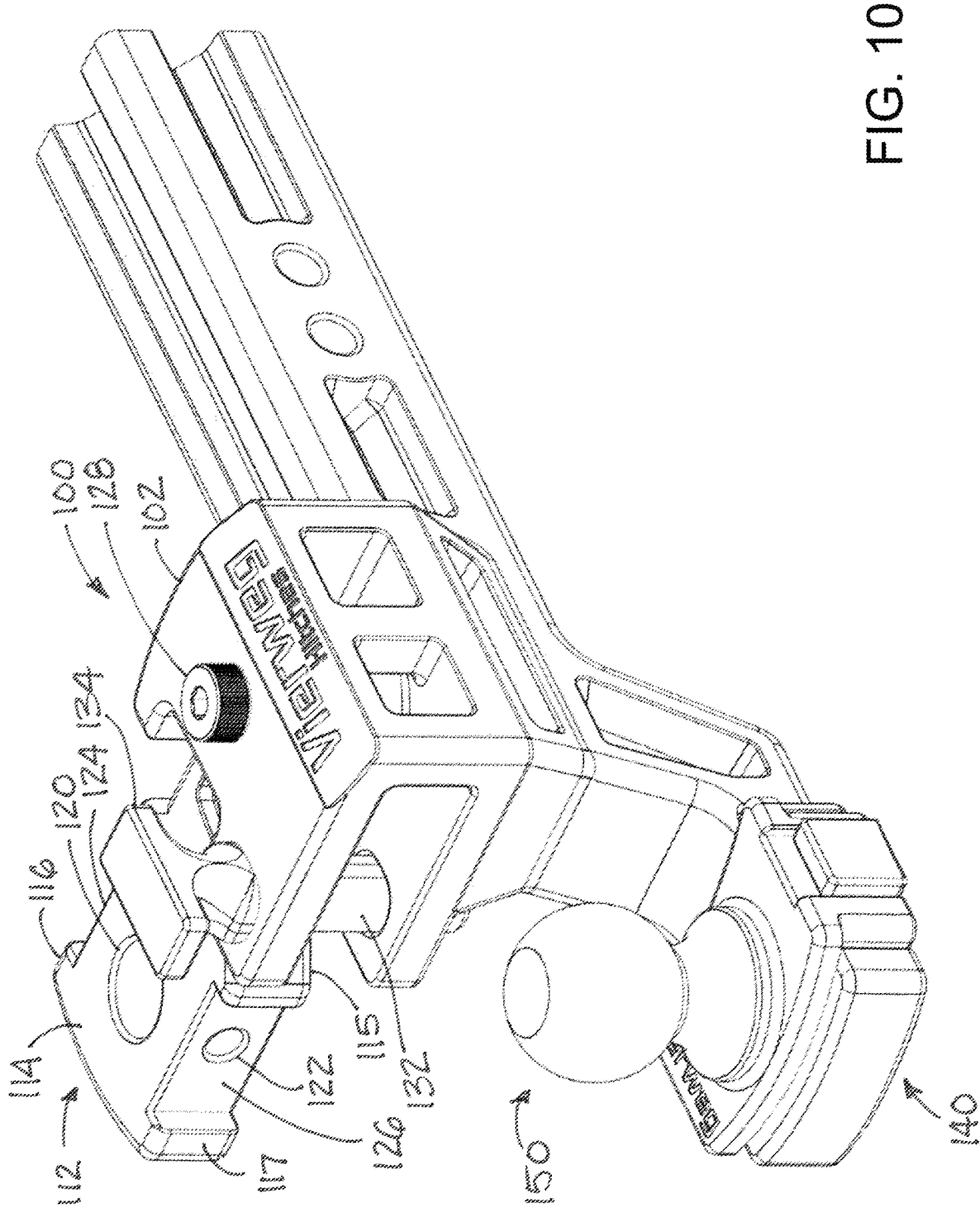
FIG. 10 is a schematic perspective view of the embodiment of FIG. 9 with the hitch apparatus in the ball hitch configuration and the upper hitch structure in the inactive condition, according to the present disclosure.
Figure 11:
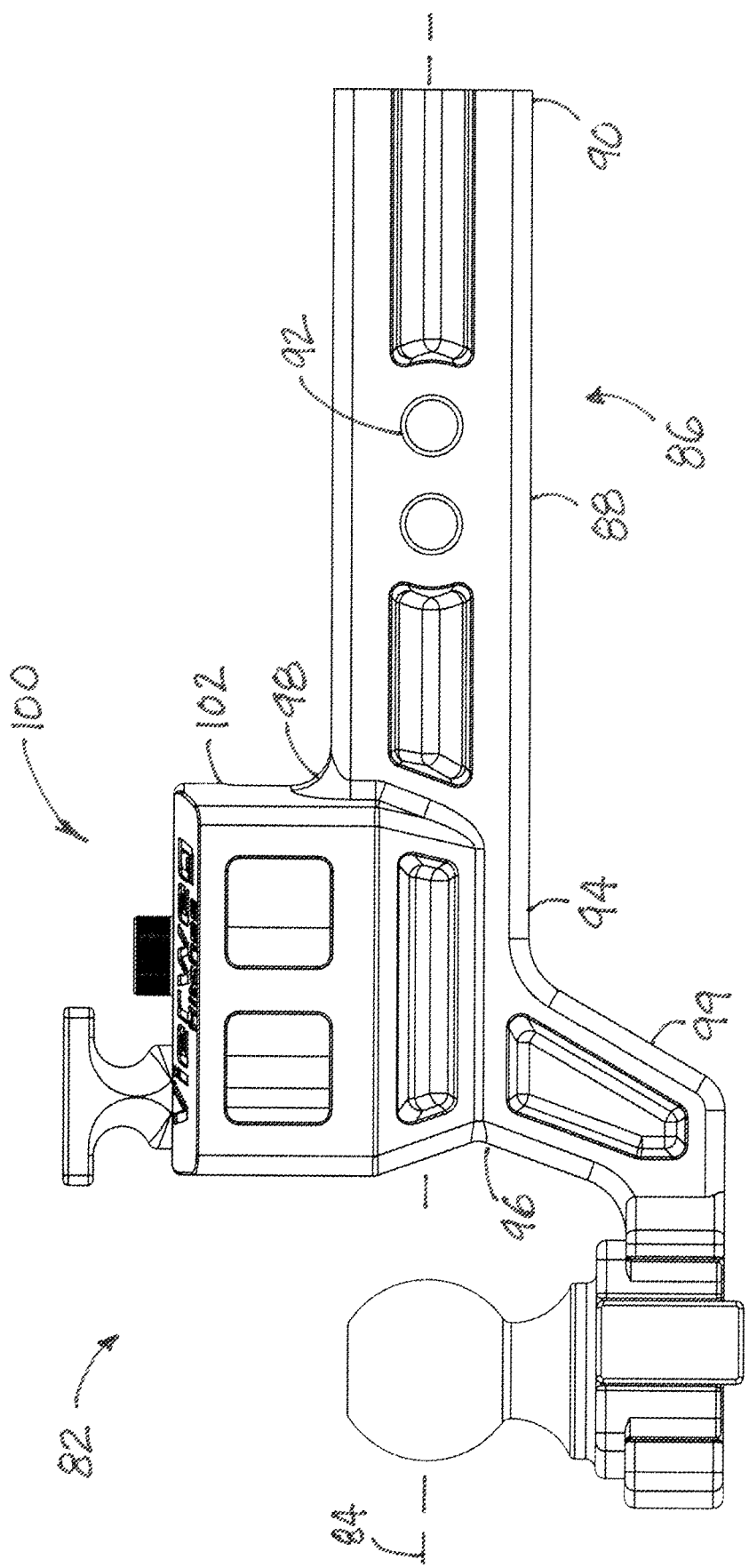
FIG. 11 is a schematic side view of the embodiment of FIG. 9 with the hitch apparatus in the ball hitch configuration and the upper hitch structure in the stored condition, according to the present disclosure.
Figure 12:
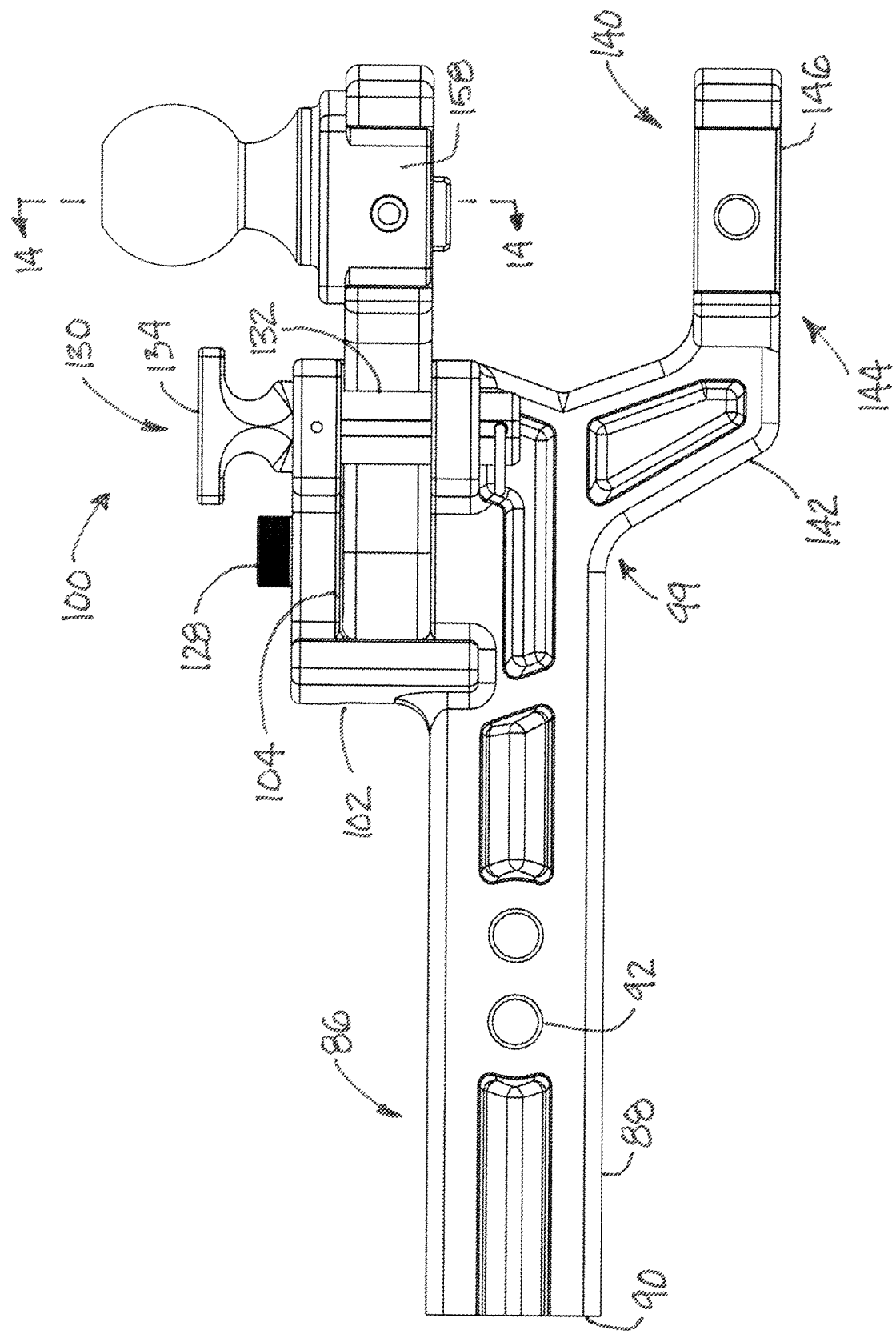
FIG. 12 is a schematic opposite side view of the embodiment of FIG. 9 with the hitch apparatus in the ball hitch configuration and the upper hitch structure in the stored condition, according to the present disclosure.
Figure 13:
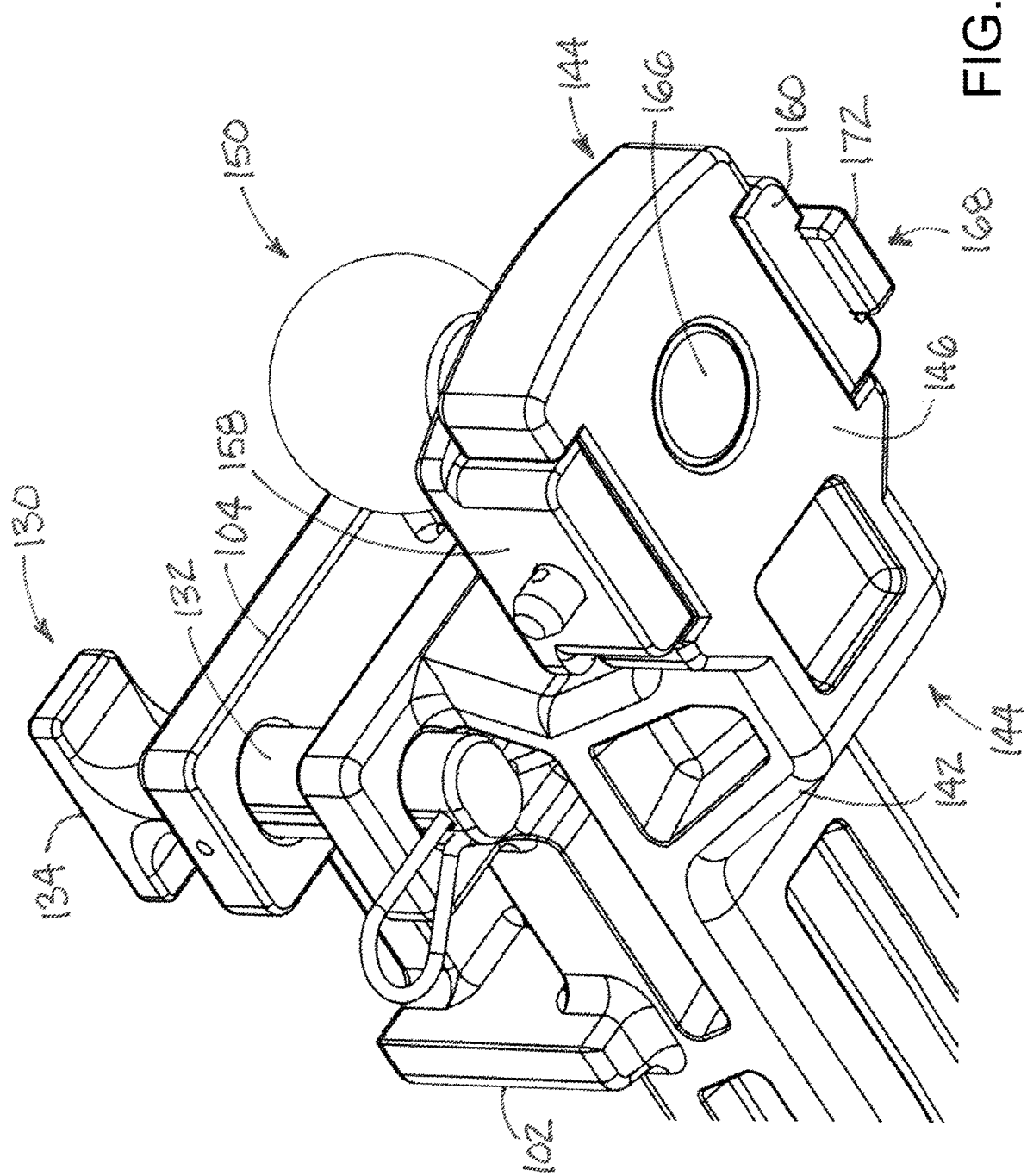
FIG. 13 is a schematic perspective view of a portion of the embodiment of FIG. 9 with the hitch apparatus in the ball hitch configuration and the upper hitch structure omitted to show detail, according to the present disclosure.
Figure 14:
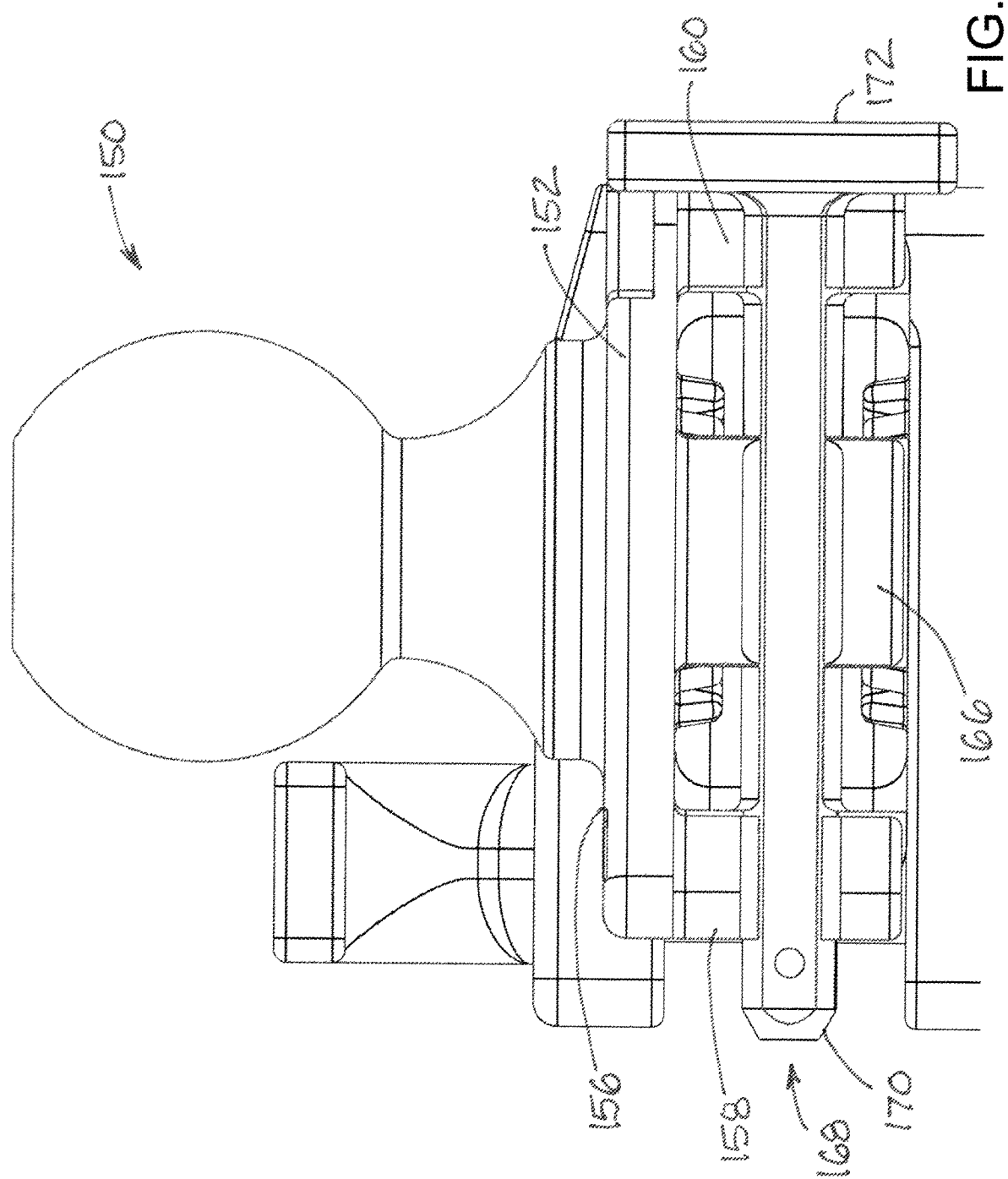
FIG. 14 is a schematic sectional view of the upper ball mount taken along line 14-14 of FIG. 12 with structure of the apparatus omitted to show detail, according to the present disclosure.
Figure 15:
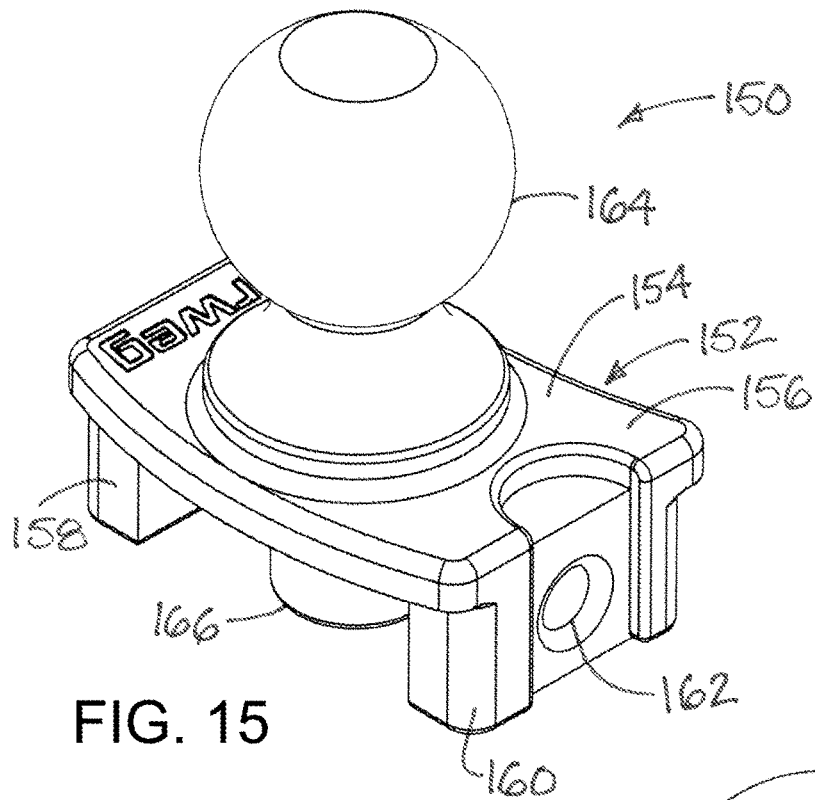
FIG. 15 is a schematic upper perspective view of a ball hitch assembly isolated from other elements of the tow hitch apparatus, according to an illustrative embodiment.
Figure 16:
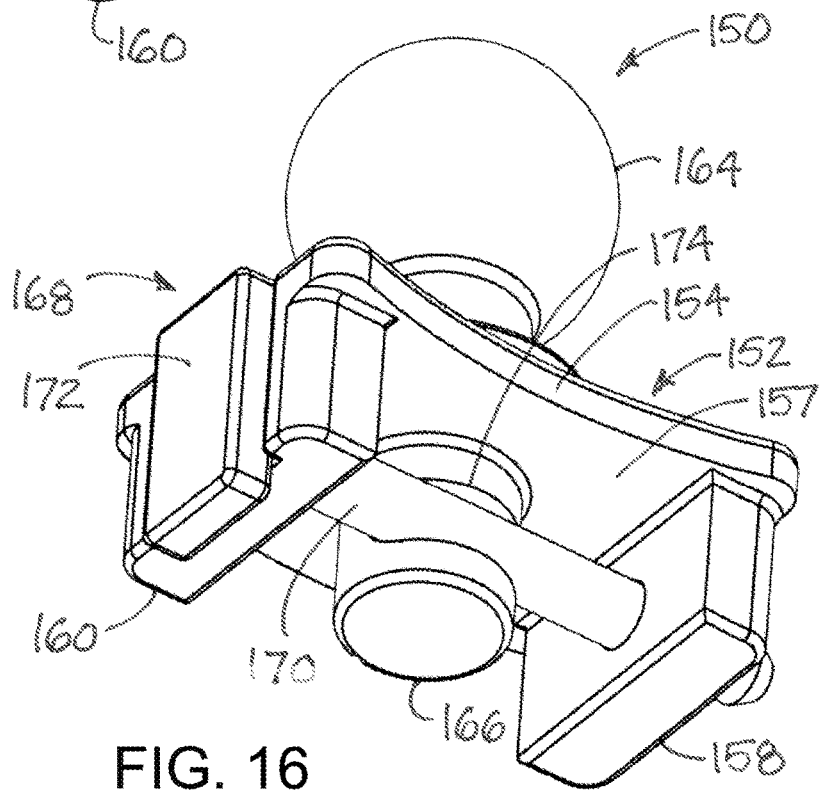
FIG. 16 is a schematic lower perspective view of a ball hitch assembly isolated from other elements of the tow hitch apparatus, according to an illustrative embodiment.
Figure 17:
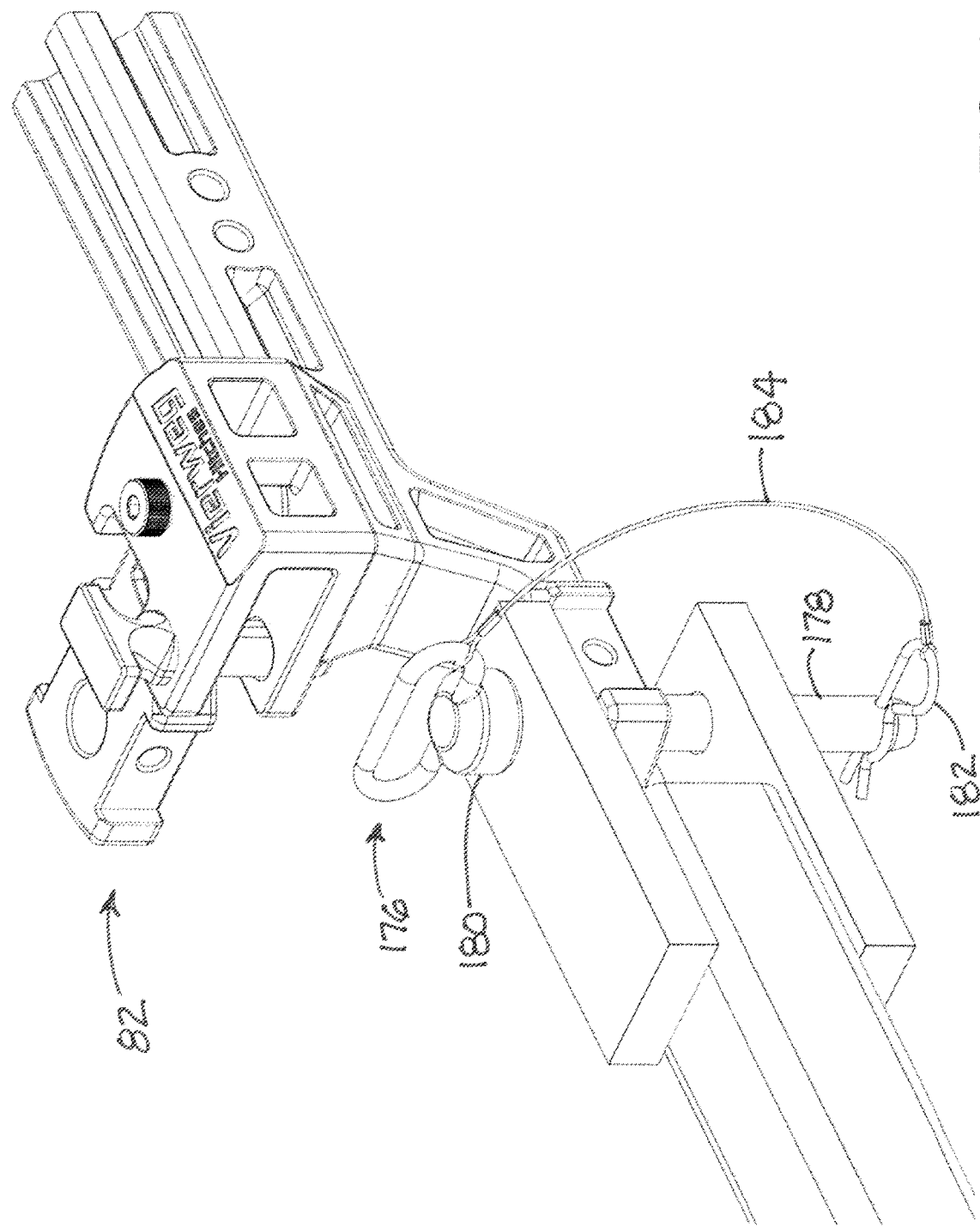
FIG. 17 is a schematic perspective view of the tow hitch apparatus in the clevis hitch configuration shown engaged with a clevis hitch, according to an illustrative embodiment.
Figure 18:
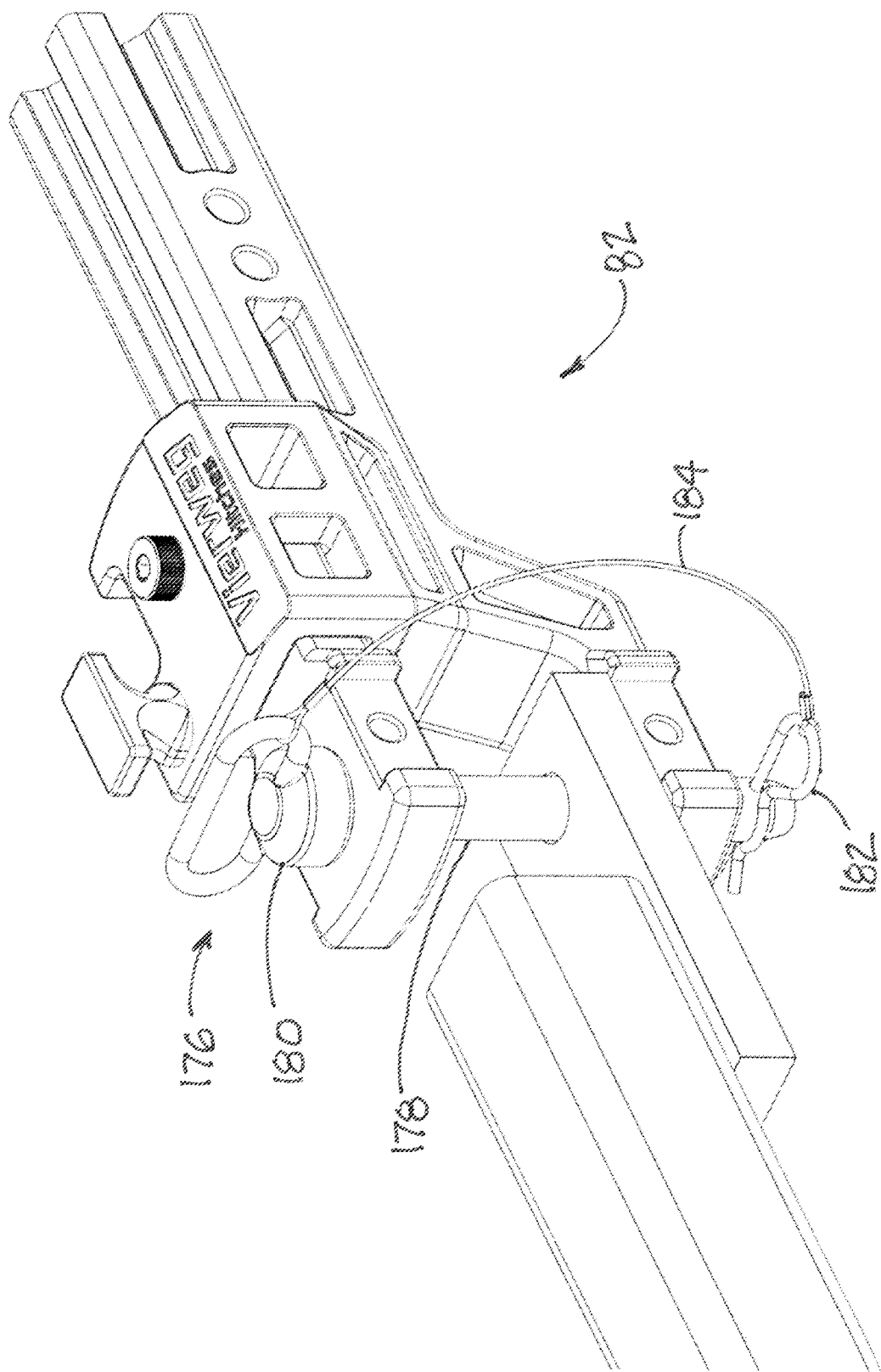
FIG. 18 is a schematic perspective view of the tow hitch apparatus in the drawbar hitch configuration shown engaged with a drawbar clevis hitch, according to an illustrative embodiment.
Figure 19:
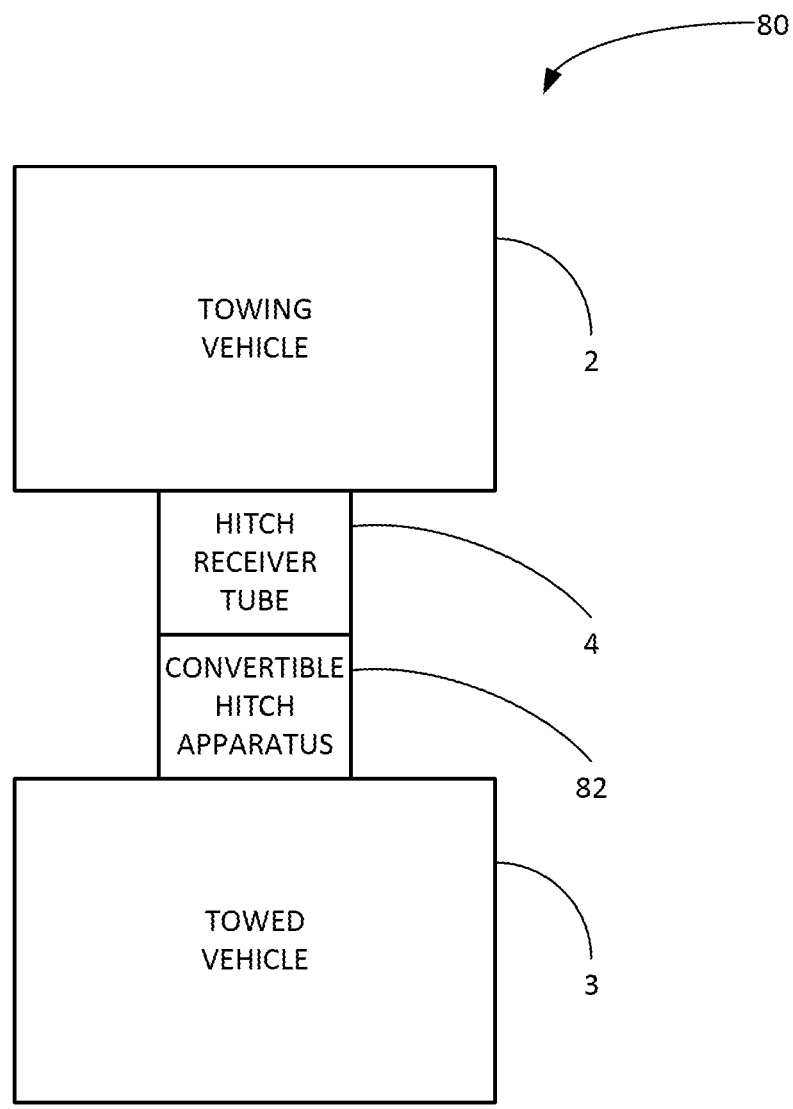
FIG. 19 is a schematic diagram of a hitch system utilizing the convertible hitch apparatus, according to the present disclosure.

With reference now to the drawings, and in particular to FIGS. 1 through 19 thereof, embodiments of a new convertible tow hitch system embodying the principles and concepts of the disclosed subject matter will be described.

Vehicles often tow or pull other vehicles, or trailers, behind them using a large variety of different hitching structures. The applicant has recognized that utilizing more than one of the different towing elements on a towing vehicle to match the variety of towing elements that may be present on different trailers has the disadvantage of requiring the user to absorb the expense of obtaining various towing elements, experience the hassle of maintaining storing the towing elements in a convenient location when not being utilized, and endure the laborious this of interchanging the towing elements when a trailer with different type of towing element is to be pulled.

As an example of some of the different towing structures utilized, many towing structures include a ball mount on the towing vehicle and a ball receiver on the towed trailer. In other towing structures, such as a clevis hitch, the towing element of the towing vehicle is a single flat tongue and the towing elements on the towed trailer are a pair of vertically spaced tongues to be positioned above and below the single tongue on the towing vehicle. In still another variation of clevis hitches, the pair of vertically spaced tongues may comprise the towing elements on the towing vehicle, and the single tongue on the towed trailer may be positioned between the vertically spaced tongues.

The applicant has thus devised a convertible hitch apparatus 10 which may be utilized as an element of a hitch system 1 between a towing vehicle 2 and a trailing vehicle 3, or trailer. The convertible hitch apparatus 10 may be utilized with a variety of hitch types, including (but not necessarily limited to) the ball hitch type and the clevis hitch type, and may support a ball mount while also functioning as the single tongue element for the double tongue element of a clevis hitch. The hitch apparatus 10 is able to mount and support a ball mount of the ball hitch as well as a hitch pin of a clevis hitch.

The convertible hitch apparatus 10 is highly suitable for use with a conventional hitch receiver type structure mounted on the towing vehicle which includes a hitch receiver tube 4 which defines a tube interior for receiving a portion of the hitch apparatus 10. The hitch apparatus 10 may be removably mountable on the hitch receiver tube 4 to effectively mount the hitch apparatus onto the towing vehicle.

The hitch apparatus 10 is generally elongated along a longitudinal axis 12 which is generally aligned with the longitudinal axis of the towing vehicle as well as (in most cases) the longitudinal axis of the towed trailer. The hitch apparatus 10 may include a mount tube assembly 14 for mounting on the hitch receiver tube 4 and a lower mount support 50 described below. In greater detail, the mount tube assembly 14 may be at least partially insertable into the interior of the receiver tube 4 to mount the assembly 14, and the hitch apparatus 10, on the towing vehicle. The mount tube assembly may define a retraction channel 16 for receiving at least a portion of the lower mount support 50. The mount tube assembly may also define an upper hitch aperture 18.

The mount tube assembly 14 may further include a mount portion 20 which may be partially insertable into the tube interior of the receiver tube 4, and may have an insertion end 22 which is insertable into the tube interior. In some embodiments, the insertion end 22 of the tube of the mount portion may be closed to reduce the opportunity for debris to enter into the retraction channel 16 defined by the mount portion. The mount portion 20 may also have a mount end 24 located opposite of the insertion end 22. A pair of securing holes 26, 27 may be formed on the mount portion, and may be located in opposition to each other on opposite sides of the retraction channel 16 for alignment with the holes (not shown) conventionally found in similar positions on the hitch receiver tube. The tubular mount portion may be formed by a mount portion wall 28 extending between the insertion 22 and mount 24 ends of the mount portion. In some embodiments, the mount portion wall 28 has a generally square cross-section measuring between approximately 1 inch and approximately 3 inches on a side. In some of the most suitable embodiments, the mount portion wall may measure approximately 2 inches or approximately 2 1/2 inches on a side, with embodiments measuring approximately 2 1/2 inches on a side being highly suitable for use.

The mount tube assembly 14 may also include a collar portion 30 which is mounted on the mount portion 20. The collar portion 30 may be located at the mount end 24 of the mount portion and may define an opening 32 which is in communication with the retraction channel 16. In some embodiments, a transverse cross-section of the opening 32 of the collar portion may be larger in area than a transverse cross-section of the retraction channel 16 of the mount portion. The collar portion 30 may include a perimeter wall 34 which may include an upper wall section 36, a lower wall section 38, and a pair of side wall sections 40, 42 extending between the upper 36 and lower 38 wall sections in a substantially rectangular configuration.

An upper extension portion 44 may extend from the collar portion 30 in the longitudinal direction of the hitch apparatus, and may extend in a direction that is opposite of the mount portion 20. The upper extension portion may extend from the upper wall section 36 of the collar portion and may define the upper hitch aperture 18.

The lower mount support 50 of the hitch apparatus 10 may be mounted on the mount tube assembly 14 in a manner that permits the support 50 to move with respect to the tube assembly. The mount support 50 may be movable between a retracted position (see, e.g., FIG. 1) and an extended position (see, e.g., FIG. 2). The lower mount support 50 may define a lower hitch aperture 52 which may be vertically alignable with the upper hitch aperture 18 when the mount support 50 is in the retracted position, and is out of vertical alignment with the upper hitch aperture when the support 50 is in the extended position. When the lower mount support 50 is in the retracted position, the upper extension portion 44 of the mount tube assembly and the lower mount support 50 may form the vertically spaced tongues of a clevis hitch. When the lower mount support is in the extended position, the mount support 50 may form the single tongue of a clevis hitch.

To secure the lower mount support 50 in either the extended position or the retracted position, the lower mount support may be provided with a first passage 54 which is alignable with the pair of securing holes 26, 27 in the mount portion 20 when the lower mount support is in the retracted position. The lower mount support 50 may also be provided with the second passage 56 which is alignable with the pair of securing holes in the mount portion when the lower mount support is in the extended position. The first and second passages may be separated from each other in the longitudinal direction of the apparatus. A mount pin 58 may releasably secure the lower mount support on the mount tube assembly when passed through the pair of securing holes 26, 27 of the mount portion and either one of the first 54 or second 56 passages in the lower mount support. Further, the mount pin 58 may also extend through the holes in the hitch receiver tube 4 to secure the hitch apparatus 10 to the hitch receiver tube 4.

Optionally, the hitch system 1 may also include a ball hitch 60 which is removably mounted on the mount tube assembly 14 such as by extending a portion of the ball hitch 60 through the upper hitch aperture 18 to thereby mount the ball hitch on the upper extension portion 44 of the collar portion. In some embodiments, the ball hitch 60 may include a ball portion 62, a flange portion 64 located below the ball portion 62, and a post portion 66 removably positionable in the hitch aperture. The post portion 66 may have threads formed thereon and a securing nut 68 may be removably mounted on the threaded shaft of the post portion to secure the flange portion 64 against the upper extension portion and thereby on the hitch apparatus.

The hitch system 1 may also optionally include a hitch pin assembly 70 which may be removably mounted on the mount tube assembly and/or the lower mount support, and extend through the upper hitch aperture and/or the lower hitch aperture, depending upon whether the lower mount support is in the retracted position or the extended position. As such, the hitch apparatus 10 may act as a double tongue clevis hitch element or a single tongue clevis hitch element. Illustratively, the hitch pin assembly may include a hitch shaft 72 which may be removably received in one or more of the hitch apertures, a hitch flange 74 on the shaft for blocking passage of the hitch shaft completely through the upper and/or lower hitch apertures, and a hinge clip (not shown) removably mounted on the hitch shaft 72 to secure the hitch shaft on the hitch apparatus.

In another aspect, such as is shown in FIGS. 9 through 18, the disclosure relates to a hitch system 80 for hitching a towing vehicle 2 and the trailing vehicle 3 (such as a trailer) together. The towing vehicle 2 may include a hitch receiver tube 4.

The hitch system 80 may comprise a convertible hitch apparatus 82 which is removably mountable on a hitch receiver tube 4. Advantageously, the hitch apparatus 82 may be convertible to have a plurality of configurations to provide connectivity with a plurality of different types of hitch configurations employed on trailing vehicles. In some embodiments, the hitch apparatus 82 may have a ball hitch configuration in which the apparatus 82 provides a hitch ball for inserting into the socket of a hitch coupler on the trailing vehicle, and may also have a clevis hitch configuration in which the apparatus 82 provides a pin for hitching to a clevis-type hitch on the trailing vehicle, and may further have a drawbar hitch configuration in which the apparatus 82 provides a pin for hitching to a drawbar on the trailing vehicle. Additionally, the convertible hitch apparatus 82 may also provide hitching elements at a variety of vertical heights above the ground surface below the towing vehicle, sometimes referred to as "drop" heights, for accommodating various trailing vehicle configurations. In general, the convertible hitch apparatus 82 may be elongated along a longitudinal axis 84, which may define a longitudinal direction for the apparatus, which may align with the normal direction of forward travel of the towing vehicle.

In greater detail, the convertible hitch apparatus 82 may include a mount structure 86 for mounting on the hitch receiver tube 4 of the towing vehicle 2, and at least a portion of the structure 86 may be inserted into the tube 4. The mount structure 86 may comprise an insertion portion 88 which may be partially inserted into the tube interior 5 of the receiver tube 4 to configure the apparatus 82 for use. The insertion portion 88 may have an insertion end 90 which inserts into the receiver tube 4 for mounting the apparatus 82. The apparatus 82 may have at least one securing bore 92 formed on the insertion portion 88 for receiving a bolt or other fastener extending through complementary holes in the receiver tube 4 to secure the insertion portion, and the apparatus 82, on the tube 4. In some embodiments, a pair of securing bores 92 may be provided along the length of the insertion portion 88 at locations spaced in the longitudinal direction of the hitch apparatus 82. The mount structure 86 may also include a protrusion portion 94 extending from the insertion portion 88 for protruding from the hitch receiver tube 4 when the apparatus 82 is mounted on the tube 4. The protrusion portion 94 may have a protrusion and 96 located opposite of the insertion end 90 on the insertion portion. The protrusion portion 94 may have an upper section 98 and a lower section 99, with the upper section being located relatively higher, and the lower section being located relatively lower, when the hitch apparatus 82 is mounted for use on a receiver tube 4.

The convertible hitch apparatus 82 may also include an upper hitch structure 100 on the mount structure 86 located on the upper section 98 of the protrusion portion. The upper hitch structure may have movable elements which provide a deployed condition (see, e.g., FIGS. 9, 12, and 18) and a stored or inactive condition (see, e.g., FIGS. 10, 11, and 17). The deployed condition may be useful for providing a ball hitch configuration with a relatively minimal amount of drop height, and as a part of a drawbar hitch configuration. The inactive condition of the upper hitch structure 100 may be useful for providing a ball hitch configuration with a relatively greater amount of drop height (as compared to the drop height provided by the deployed condition) and a clevis hitch configuration.

In greater detail, the upper hitch structure 100 may include a support frame 102 which may be positioned above the upper section 98 of the insertion portion of the mount structure. The support frame 102 may define a slot 104, which may extend substantially horizontally when the hitch apparatus 82 is mounted for use. The upper hitch structure 100 may also include an upper ball mount 110 which may be movable between a deployed position (see, e.g., FIGS. 9, 12, and 18) that generally corresponds to the deployed condition of the hitch structure 100, and a stored or inactive position (see, e.g., FIGS. 10, 11, and 17) which may generally correspond to the inactive condition of the structure 100. The upper ball mount 110 may be mounted on the support frame 102, and may be movable with respect to the frame 102, such as in the slot 104 of the frame. Illustratively, the deployed position of the upper ball mount 110 may be characterized by the ball mount extending substantially parallel to the longitudinal axis 84, and the inactive position of the mount 110 may be characterized by the ball mount extending substantially perpendicular to the longitudinal axis 84.

The upper ball mount 110 may include a tongue element 112 which is pivotally mounted on the support frame 102 for movement between positions corresponding to the deployed and inactive positions of the ball mount 110. Illustratively, the tongue element 112 may have an upper face 114 and a lower face 115, and may also have side faces 116, 117 positioned on opposite sides of the element 112 that extend between the upper 114 and lower 115 faces. The tongue element 112 may have a tongue aperture 120 which may extend between the upper 114 and lower 115 faces and may extend along a substantially vertical axis when the apparatus 82 is mounted for use. The tongue element 112 may further have a pin passage 122 which may extend between the side faces 116, 117, and may extend along a substantially horizontal axis when the apparatus 82 is mounted for use. A portion of the pin passage 122 may intersect and be in communication with the tongue aperture 120. The tongue element 112 may also have a pair of side depressions 124, 126, which each may be formed on one of the side faces 116, 117 of the tongue element such that the side depressions open in substantially opposite directions with respect to each other. The pin passage 122 may extend between the side depressions 124, 126 such that ends of the pin passage open into the side depressions.

The upper ball mount 110 may also include a pivot pin 128 for mounting the tongue element 112 on the support frame 102. The pivot pin 128 may extend along a substantially vertical axis to permit pivoting of the tongue element 112 with respect to the frame 102 in a substantially horizontal plane between the deployed and inactive positions. The upper ball mount 110 may also include a locking pin 130 which is configured to lock the tongue element 112 in positions corresponding to the deployed and inactive positions of the ball mount 110. The locking pin 130 may be extendable through the tongue element and into the support frame 102 in each of the deployed and inactive positions to provide positive locking of the tongue element in each of the discrete positions. The locking pin 130 may be substantially vertically oriented when inserted through the tongue element and support frame. Illustratively, the locking pin 130 may include a pin portion 132 which is extendable through the tongue element and the support frame, and a grip portion 134 which extends from the pin portion 132 and provides a structure for gripping by the fingers of the user of the apparatus 82, as well as limiting downward movement of the pin portion through the tongue element in support frame. Optionally, a retaining pin, such as a hairpin cotter pin, may be utilized to selectively retain the locking pin 130 in position (see, e.g., FIG. 13).

The convertible hitch apparatus 82 may further include a lower hitch structure 140 which may be located on the lower section 99 of the protrusion portion 94. In some embodiments, the lower section 99 may form a drop extension 142 which extends downwardly from the protrusion portion 94 when the apparatus 82 is mounted for use. The lower hitch structure 140 may include a lower ball mount 144 which is mounted on the mount structure 86, such as the drop extension 142 of the structure 86. The lower ball mount 144 may be similar in configuration to the upper ball mount 110, but may not be movable with respect to the drop extension 142 of the protrusion portion of the mount structure, and thus the position of the mount 144 may be maintained in both the deployed and inactive conditions of the upper hitch structure. The lower ball mount 144 may include a lower tongue element 146 having an upper face and a lower face, as well as side faces similar to the tongue element 112 of the upper ball mount. The lower tongue element 146 may also include a lower tongue aperture extending between the upper and lower faces of the element 46, a lower pin passage extending between the side faces of the lower tongue element, and a pair of lower side depressions located on the side faces of the lower tongue element.

The convertible hitch apparatus 82 may also include a ball hitch assembly 150 which is removably mountable on one of the ball mounts 110, 144, particularly if the ball mounts are configured similarly in dimension and shape. In some embodiments, a ball hitch assembly 150 is removably mounted on each of the ball mounts 110, 144 to provide a ball hitch at two different drop heights, and may also be utilized to provide interchangeable ball hitches with different ball diameters. The ball hitch assembly 150 may be engageable with the tongue aperture of either of the ball mounts. For the purposes of this disclosure, the ball hitch assembly 110 will be described in the context of mounting on the upper ball mount 110, with the understanding that the ball hitch assembly 110 may similarly be mounted on a lower ball mount 144 having elements and configurations similar to the upper ball mount 110.

The ball hitch assembly 150 may have a mounted condition with respect to a ball mount, such as the upper ball mount 110, while being removable from the ball mount during periods of nonuse. The ball hitch assembly 150 may include a base portion 152 for positioning on the tongue element 112 of the upper ball mount of the upper hitch structure 100. The base portion 152 may rest on the upper face 114 of the tongue element when the assembly 150 is in a mounted condition. The base portion 152 may have a main section 154 with a top 156 and a bottom 157, and the bottom 157 may rest upon the upper face of the tongue portion. The base portion 152 may also have a pair of lateral sections 158, 160 which may extend from the main section 154 in a laterally spaced relationship to each other. The lateral sections 158, 160 may extend downwardly with respect to the main section 154 when the ball hitch assembly 150 is in a mounted condition. The lateral sections 158, 160 may be positioned in the respective side depressions 124, 126 when the hitch assembly 150 is positioned on the ball mount to increase the physical interlock between the hitch assembly and ball mount. Each of the lateral sections 158, 160 may have a pin aperture 162 which is alignable with the pin passage 122 of the tongue element 112 when the ball hitch assembly is in a mounted condition.

The ball hitch assembly 150 may further include a ball portion 164 mounted on the base portion 152, and the ball portion may extend upwardly from the main section 154 of the base portion when the apparatus 82 is mounted for use. The ball hitch assembly 150 may further include a post portion 166 for engaging the tongue element 112 of the ball mount 110, and more specifically the post portion 166 may be removably positioned in the tongue aperture 120 of the mount 110. The post portion 166 may extend from the base portion 152, and may extend outwardly from the main section 154 of the base portion and generally in the same direction as the lateral sections 158, 160 of the base portion.

A securing pin 168 may be provided as a part of the ball hitch assembly 150 for selectively securing the ball hitch assembly to the upper ball mount, and the securing pin 168 may be engageable with the base portion 152 and the tongue element 112 of the ball mount 110 to secure the ball hitch assembly. The securing pin 168 may be removably insertable into the pin apertures 162 of the lateral sections and the pin passage 122 of the tongue element 112 when the apertures and the passage are aligned with each other. An illustrative securing pin 168 may include a pin section 170 which is insertable into the pin passage and the pin apertures, and a grip section 172 extending from the pin section 170 for gripping by the fingers of the user during insertion and withdrawal of the pin 168. In some embodiments, a notch 174 may be formed on the post portion 166 of the assembly 150 for receiving a portion of the pin section 170 of the securing pin 168 when the securing pin is inserted through the pin apertures and pin passage of the tongue element to provide further securement of the ball hitch assembly to the upper ball mount.

The convertible hitch apparatus with 82 may also include a hitch pin assembly 172 removably mountable on at least one of the ball mounts 110, 144, typically when the ball hitch assembly 150 is not actively being utilized on the apparatus 82. For example, the hitching assembly 176 may be mounted on the upper ball mount 110 and the lower ball mount 144 when the apparatus 82 is in the clevis hitch configuration. As a further example, the hitch pin assembly 176 may be mounted on the lower ball mount 144 (or the upper ball mount 110) when the apparatus 82 is in the drawbar hitch configuration. The hitch pin assembly 176 may be insertable through the tongue aperture of at least one of the ball mounts 110, 144, and may be simultaneously insertable through the tongue apertures of both upper 110 and lower 144 ball mounts, depending upon the desired hitch configuration. Illustratively, the hitch pin assembly 176 may include a hitch pin shaft 178 for removably inserting into the tongue aperture of at least one of the ball mounts, and in some configurations the tongue apertures of both of the ball mounts. The hitch pin shaft 178 may extend through the tongue aperture of the upper and lower ball mounts in the clevis hitch configuration of the apparatus 82, and through the tongue aperture of either the lower or the upper ball mount in the drawbar hitch configuration of the apparatus 82. The hitch assembly 176 may also include a hitch pin flange 180 on the hitch pin shaft 178 for blocking passage of the hitch pin shaft completely through the tongue aperture, and a hitch pin clip 182 removably mountable on the hitch pin shaft 178 at an opposite end of the shaft from the flange to secure the hitch pin shaft on at least one of the ball mounts. Optionally, the hitch pin assembly 176 may include a hitch pin lanyard 184 for connecting the hitch pin clip 182 to the hitch pin flange 180 to resist separation of the hitch pin clip from the hitch pin flange and loss of the clip.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A convertible hitch apparatus removably mountable on a hitch receiver tube, the hitch apparatus being elongated along a longitudinal axis, the hitch apparatus comprising:
   a mount structure for mounting on the hitch receiver tube, the mount structure being at least partially insertable into the receiver tube, the insertion portion having an insertion end insertable into the receiver tube and a protrusion end opposite of the insertion end;
   an upper hitch structure mounted on the mount structure toward the protrusion end, the upper hitch structure having a deployed condition and an inactive condition, the upper hitch structure comprising a support frame and an upper ball mount mounted on the support frame for movement between a deployed position corresponding to the deployed condition and a storage position corresponding to the inactive condition;

a lower hitch structure mounted on the mount structure toward the protrusion end at a position below the upper hitch structure, the lower hitch structure including a lower ball mount mounted on the mount structure;

a ball hitch assembly removably mountable on at least one of the ball mounts; and wherein the upper ball mount comprises a tongue element pivotally mounted on the support frame, the tongue element having a tongue aperture extending along a substantially vertical axis when the hitch apparatus is mounted for use.

2. The apparatus of claim 1 wherein the hitch apparatus has a ball hitch configuration, the hitch apparatus having a clevis hitch configuration, and the hitch apparatus having a drawbar hitch configuration.

3. The apparatus of claim 2 additionally comprising a hitch pin assembly removably mountable one of the hitch structures in the clevis hitch configuration, the hitch pin assembly being mountable on both of the hitch structures in the drawbar configuration.

4. The apparatus of claim 1 wherein the lower ball mount of the lower hitch structure is immovable with respect to the mount structure.

5. The apparatus of claim 1 wherein the deployed position of the upper hitch structure is characterized by the upper ball mount extending parallel to the longitudinal axis of the hitch apparatus, and the inactive position of the upper hitch structure is characterized by the upper ball mount extending substantially perpendicular to the longitudinal axis of the hitch apparatus.

6. The apparatus of claim 1 wherein the upper ball mount comprises a locking pin configured to lock the tongue element in the deployed and inactive positions, the locking pin being extendable through the tongue element and the support frame in each of the deployed and inactive positions.

7. The apparatus of claim 1 wherein the upper ball mount comprises a pin passage extending between side faces of the tongue element, the pin passage being in communication with the tongue aperture.

8. The apparatus of claim 1 wherein the upper ball mount comprises a pair of side depressions, each side depression being formed on one side face of the tongue element such that the side depressions open in opposite directions with respect to each other, a pin passage extending between the side depressions.

9. The apparatus of claim 1 wherein the lower ball mount comprises a lower tongue element with a lower tongue aperture, the lower tongue aperture being aligned along a substantially vertical axis with the tongue aperture of the tongue element of the upper ball mount when the upper ball mount is in the deployed position.

10. The apparatus of claim 1 wherein the lower hitch structure is mounted on a drop extension extending in a downward direction from the mount structure when the hitch apparatus is mounted for use.

11. A convertible hitch apparatus removably mountable on a hitch receiver tube, the hitch apparatus being elongated along a longitudinal axis, the hitch apparatus comprising:

a mount structure for mounting on the hitch receiver tube, the mount structure being at least partially insertable into the receiver tube, the insertion portion having an insertion end insertable into the receiver tube and a protrusion end opposite of the insertion end;

an upper hitch structure mounted on the mount structure toward the protrusion end, the upper hitch structure having a deployed condition and an inactive condition, the upper hitch structure comprising a support frame and an upper ball mount mounted on the support frame for movement between a deployed position corresponding to the deployed condition and a storage position corresponding to the inactive condition;

a lower hitch structure mounted on the mount structure toward the protrusion end at a position below the upper hitch structure, the lower hitch structure including a lower ball mount mounted on the mount structure;

a ball hitch assembly removably mountable on at least one of the ball mounts;

wherein at least one of the ball mounts comprises a tongue element with a tongue aperture extending along a substantially vertical axis when the hitch apparatus is mounted for use;

wherein the ball hitch assembly has a mounted condition with respect to one of the ball mounts; and wherein the ball hitch assembly comprises:

a base portion positioned on the tongue element of one of the hitch structures in the mounted condition of the ball hitch assembly; and a ball portion mounted on the base portion.

12. The apparatus of claim 11 wherein the base portion of the ball hitch assembly includes:

a main section with a top and a bottom, the bottom of the main section resting upon the tongue element in the mounted condition of the ball hitch assembly; and a pair of lateral sections, the lateral sections extending from the main section in a spaced relationship with respect to each other, the lateral sections being positionable on opposite sides of the tongue element of the at least one ball mount.

13. The apparatus of claim 12 wherein the lateral sections are positionable in side depressions formed on opposite sides of the tongue element of the at least one ball mount when the ball hitch assembly is in the mounted condition.

14. The apparatus of claim 12 wherein each of the lateral sections of the base portion of the ball hitch assembly has a pin aperture alignable with a pin passage extending through the tongue element of the at least one ball mount when the ball hitch assembly is in the mounted condition; and wherein the ball hitch assembly further includes a securing pin for selectively securing the ball hitch assembly to the at least one ball mount, the securing pin being removably insertable into the pin apertures of the lateral sections of the base portion of the ball hitch assembly and the pin passage of the tongue element of the at least one ball mount.

15. The apparatus of claim 11 wherein the ball hitch assembly further includes a post portion for engaging the tongue element of the at least one ball mount when the ball hitch assembly is in the mounted condition.

16. The apparatus of claim 15 wherein the post portion of the ball hitch assembly is removably positioned in the tongue aperture of the tongue element of the at least one ball mount in the mounted condition of the ball hitch assembly.

17. The apparatus of claim 16 wherein a notch is formed on the post portion of the ball hitch assembly for receiving a portion of a securing pin when the securing pin is inserted through pin apertures of the base portion of the ball hitch assembly and a pin passage of the tongue element of the at least one ball mount.

18. A convertible hitch apparatus removably mountable on a hitch receiver tube, the hitch apparatus being elongated along a longitudinal axis, the hitch apparatus comprising:
- a mount structure for mounting on the hitch receiver tube, the mount structure being at least partially insertable into the receiver tube, the insertion portion having an insertion end insertable into the receiver tube and a protrusion end opposite of the insertion end;
- a lower hitch structure mounted on the mount structure toward the protrusion end, the lower hitch structure including a lower ball mount mounted on the mount structure;
- an upper hitch structure mounted on the mount structure toward the protrusion end, the upper hitch structure having a deployed condition and an inactive condition, the upper hitch structure including a support frame and an upper ball mount mounted on the support frame;
- wherein the upper ball mount includes a tongue element having a tongue aperture extending along a substantially vertical axis when the hitch apparatus is mounted for use, the tongue element being mounted on the support frame in a manner permitting pivoting of the tongue element about a substantially vertical axis when the hitch apparatus is mounted for use to move the tongue element between a deployed position corresponding to the deployed condition and a storage position corresponding to the inactive condition; and
- wherein the deployed position of the upper hitch structure is characterized by the upper hitch structure being positioned over the lower hitch structure, the storage position of the upper hitch structure being characterized by the upper hitch structure being pivoted out of the deployed position above the lower hitch structure and into a position in which the upper hitch structure is not over the lower hitch structure.

19. The apparatus of claim 18 wherein the lower ball mount of the lower hitch structure has a lower hitch aperture extending along a substantially vertical axis when the hitch apparatus is mounted for use.

20. The apparatus of claim 18 additionally comprising a ball hitch assembly removably mountable on at least one of the ball mounts.

\* \* \* \* \*